United States Patent [19]
Shiban

[11] Patent Number: 6,030,584
[45] Date of Patent: Feb. 29, 2000

[54] HAZARDOUS GAS PRECIPITATOR

[75] Inventor: Samir S. Shiban, Chandler, Ariz.

[73] Assignee: Innovative Engineering Solutions, Inc., Chandler, Ariz.

[21] Appl. No.: 09/036,679

[22] Filed: Mar. 9, 1998

[51] Int. Cl.⁷ .............................. B01D 53/34; B01D 45/08
[52] U.S. Cl. .................... 422/168; 422/169; 422/171; 422/182; 422/228; 422/210; 55/413; 55/427; 55/436; 55/439; 55/446; 55/465
[58] Field of Search ..................... 422/168–172, 422/182, 224, 228, 210; 55/413, 427, 436, 439, 446, 465, 463; 15/104.16

[56] References Cited

U.S. PATENT DOCUMENTS

| | | | |
|---|---|---|---|
| 5,271,908 | 12/1993 | Shiban et al. | 422/224 |
| 5,353,829 | 10/1994 | Shiban | 137/88 |
| 5,662,722 | 9/1997 | Shiban | 55/413 |
| 5,699,826 | 12/1997 | Shiban | 137/244 |

*Primary Examiner*—Hien Tran
*Attorney, Agent, or Firm*—James D. Givnan, Jr

[57] ABSTRACT

An apparatus defines a chamber into which hazardous gas is discharged. Disposed about the hazardous gas discharge flow are nozzles from which oxygen flows for mixing with the hazardous gas. A structure within the chamber receives the hazardous gas and oxygen and defines an area in which a reaction occurs therebetween. The structure includes perforate components which deter the formation of gas pockets and diminish the risk of explosion. The hazardous gas mixed with oxygen is subsequently directed toward baffles on which may be deposited matter precipitating from the combined oxygen and hazardous gas. Prior to discharge from the apparatus, the gas and oxygen mixture may be subjected to a filter for further removal of matter. Both hazardous gas and oxygen flows are induced through the apparatus by a source of reduced pressure.

2 Claims, 1 Drawing Sheet

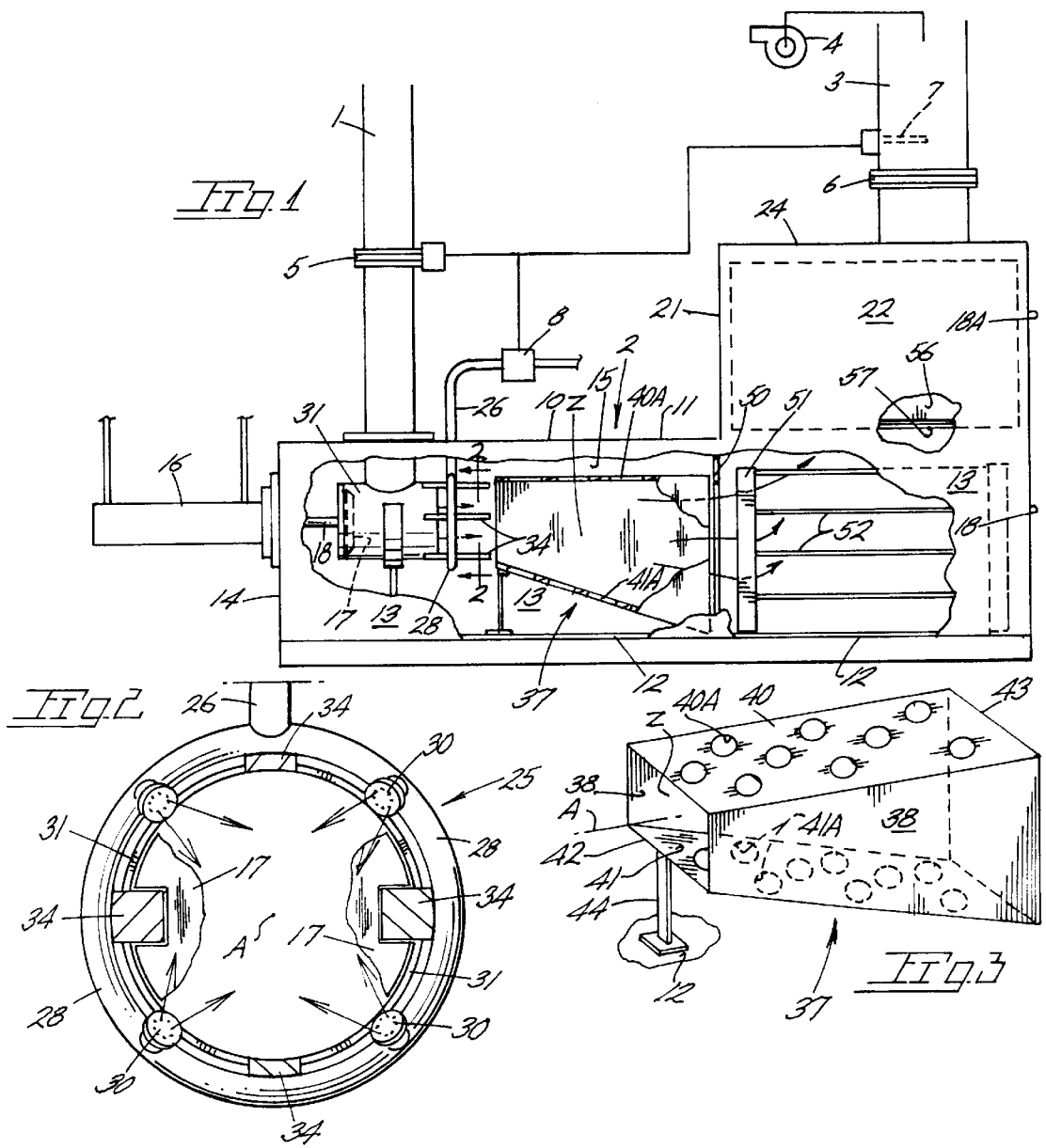

HAZARDOUS GAS PRECIPITATOR

BACKGROUND OF THE INVENTION

The present invention concerns an apparatus for treating a hazardous gas flow with oxygen and providing for collection of resulting matter to the extent the remaining mixture may be released to the atmosphere.

In the prior art are gas/air mixing apparatuses which serve to infuse air into a hazardous gas flow to the extent the resulting gas/air mixture is rendered inert permitting discharge into the atmosphere. Such apparatuses utilize baffles for the collection of the deposits resulting from air and hazardous gas mixing. The apparatuses however rely on a continuous high volume flow of air through a mixing chamber. Removable baffle structures are utilized in certain of such apparatuses which may be removed for periodic cleaning. The large volume of air utilized in some mixing apparatuses is objectionable.

U.S. Pat. No. 5,699,826, issued to the present inventor, is incorporated herein by reference and pertains generally to the provision of a rake to remove deposits from a gas conduit.

SUMMARY OF THE PRESENT INVENTION

The present invention is directed toward an apparatus providing for infusion of oxygen directly into a flow of hazardous gas to precipitate harmful matter prior to discharge of the mixed flow to the atmosphere.

Features of the present apparatus include a hazardous gas conduit structure with the gas discharged within a closed housing of the apparatus and subjected to oxygen injector means. A reaction zone in the housing is provided for the gas/oxygen mixture and occurs within an elongate removable member having apertured walls. Suitable oxygen injector means includes nozzles disposed to achieve oxidizing of the hazardous gas to preclude formation of gas pockets and risk of explosion. Oxygen nozzles are disposed about the hazardous gas flow and direct oxygen flows into same. A rake located in a gas discharge conduit permits periodic removal of deposits. The oxidizing of a hazardous gas used in a manufacturing process is accomplished without risk of gas escaping from the apparatus as the latter is closed from direct communication with the atmosphere. The apparatus may be provided with a filter for the further collection of oxidized matter subsequent to passage through removably mounted apparatus baffles.

Important objectives of the present apparatus include the mixing of oxygen to reduce the total amount of apparatus discharge and detering of gas pockets and hence risk of explosion.

BRIEF DESCRIPTION OF THE DRAWINGS

In the accompanying drawings:

FIG. 1 is a front elevational view of the present apparatus with parts broken away for purposes of illustration;

FIG. 2 is a vertical sectional view taken along line 2—2 of FIG. 1; and

FIG. 3 is a perspective view of an internal member of the apparatus defining a reaction zone.

DETAILED DESCRIPTION OF THE PREFERRED EMBODIMENTS

With continuing attention to the drawings wherein applied reference numerals indicate parts similarly hereinafter identified, the reference numeral 1 indicates an inlet conduit through which a hazardous gas, e.g., a gas utilized in manufacturing operation, is delivered into an apparatus indicated generally at 2. One such hazardous gas treated by the present apparatus is silane SiH4, used during the manufacture of certain electronic components. Additionally in communication with apparatus 2 is an exhaust or outlet conduit 3 which exhausts to the atmosphere via an exhaust fan 4. Both inlet conduit 1 and outlet conduit 3 respectively include valves at 5 and 6 such as the knife gate type which, when actuated, automatically or manually, close their respective conduits. A temperature sensor 7 in exhaust conduit 3 serves to actuate valve 5 in the event of an unacceptable temperature reduction in the conduit flow. An oxygen flow meter at 8 may also close valve 5 in the event of an unacceptable reduction in oxygen flow. Valves 5 and 6 are also manually actuable to isolate the apparatus for servicing, repair, etc.

With attention now to the apparatus generally at 2, a housing 10 includes top and bottom walls 11 and 12 with side walls indicated at 13. End walls at 14 and 18 serve to close ends of the apparatus and, along with the foregoing walls, define a chamber at 15. End wall 14 additionally serves to mount an air cylinder 16 for periodic actuation of a rake 17 by a cylinder piston rod 18 as disclosed in the above noted U.S. patent. Housing 10 further includes an upward extension enclosed by side walls 22, an end wall extension 18A, and end wall 21 and a top wall 24.

In chamber 15, is a reaction zone Z defined by an apertured metal structure or insert of trapezoidal shape in side elevation generally at 37 having top and bottom walls 40–41 apertured at 40A–41A. Side walls are at 38. An inlet end is at 42 while an outlet end is at 43. A leg 44 supports the inlet end adjacent the outlet 31 of conduit 1. Structure 37 is readily removable for removal of deposits upon removal of a side wall 13. Apertures 41A permit discharge of collected particles.

Oxygen injector means at 25 includes an oxygen source shown as a pipe 26 served by a source (not shown) through flow sensor 8. Pipe 26 terminates at a manifold 28 in place on guides 34 carried by gas outlet 31 and along which rake 17 travels during a cycle of operation. Rake structure is fully disclosed in U.S. Pat. No. 5,699,826 incorporated herein by reference. Nozzles 30 are on manifold 28 and discharge flows in an inclined manner, into the hazardous gas flow, discharged from outlet 31, along a course having an axis at A. Accordingly nozzle discharged flows confine and direct discharged gas into inlet end 42 of insert 37 and into reaction zone Z defined thereby.

The gas and oxygen react in zone Z with risk of gas pockets diminished by the non-continuous nature of housing walls 40–41. The mixture thereafter passes through a baffle at 50 having openings and then into contact with a removable baffle component 51 having multiple apertured plates as at 52. For removal of baffle 51 for servicing apparatus side wall 13 is removable from housing 2. The plates of baffle component 51 are arranged to cause the mixed gas and oxygen to follow a tortuous course to promote the deposit of matter on plates 52. For this purpose the plates are preferably provided with misaligned apertures on adjacent plates.

Provision is made in the apparatus for the optional installation of a filter component or a chemical resin bed at 56 in that area enclosed by apparatus walls 18A, 22, 21 and 24. Internal flanges as at 57 support the filter or, alternatively, a bed of chemical resinous material at 56 and removal for replacement purposes. The hazardous gas being treated will determine the type of filter or chemical bed utilized or the non-use of same.

A method of rendering hazardous gas to an inert state includes the inducing of a hazardous gas flow through inlet conduit 1 as by communicating same with the intake of a centrifugal fan or blower at 4. The gas is discharged via outlet 31 in a flow into which oxygen is infused by the nozzles 30 located adjacent gas outlet. The gas and oxygen mixture is subsequently introduced into insert 37 whereat further mixing occurs in reaction zone Z promoted by the perforate nature of the insert walls. The subsequent tortuous path of the mixture through and past baffles of the apparatus causes the depositing of matter from the mixture on baffle surfaces as earlier noted.

Preferably, prior to exhausting the mixture from housing 10, the mixture is subjected to passage through a filter 56, if compatable with the hazardous gas being treated, and which may be of a fibrous nature and disposable. The fan 4 discharges the virtually solids free remainder of the mixture to the atmosphere.

In operation, a hazardous gas flow, for example silane SiH4, is induced by blower 4 into the apparatus via inlet conduit 1 and discharged in an inert state from outlet 3. The nozzles 30 direct oxygen flows along paths inclined to the hazardous gas flow to infuse same with oxygen and whereafter is drawn into reaction zone Z with the perforated walls of insert 37 serving to deter the formation of gas pockets. Subsequently the gas/oxygen mixture encounters baffles resulting in a tortuous upward course being imparted to the mixture contributing to precipitation of oxidized particles. Provision is made for subjecting the mixture to a filter, if applicable, for the gas being treated.

The sensor at 7 is responsive to an unacceptable temperature change and initiates closure of the valve equipped inlet conduit. A removably mounted side wall of the apparatus enables periodic access to the baffles as well as the filter for servicing and replacement purposes. Further reaction zone defining insert 37 is removable for periodic cleaning.

In one embodiment of the invention to treat silane SiH4 gas flowing at a rate of 2 liters per minute, the chamber 15 may be of a vertical cross section of less than a square foot and of stainless steel construction. As for example, cumulative flow of oxygen injected into the above noted silane gas flow would be approximately 2 cubic feet per minute.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. An apparatus for removing matter from a flow of hazardous gas, said apparatus comprising, a housing, a hazardous gas conduit structure having an outlet for discharging a hazardous gas flow into said housing, injector means including a manifold with nozzles located adjacent said outlet of said hazardous gas conduit structure for infusing oxygen into the hazardous gas flow, an insert of trapezoidal shape in side elevation in said housing having an inlet end spaced from said nozzles and defining a zone for reception of the hazardous gas flow and oxygen from said nozzles and in which a reaction therebetween occurs, said insert having perforate surfaces detering the formation of pockets of hazardous gas, and baffles in said housing imparting a tortuous course to a mixture of the hazardous gas flow and oxygen and promoting precipitation of deposits from the mixture.

2. The apparatus claimed in claim 1 wherein said nozzles are inclined to an axial gas flow discharged from said outlet.

* * * * *